US008797644B2

(12) United States Patent
Karsten et al.

(10) Patent No.: US 8,797,644 B2
(45) Date of Patent: Aug. 5, 2014

(54) CAPILLARY-BASED CELL AND TISSUE ACQUISITION SYSTEM (CTAS)

(75) Inventors: Stanislav L. Karsten, Los Angeles, CA (US); Anatol Bragin, North Hollywood, CA (US)

(73) Assignee: The Regents of the University of California, Oakland, CA (US)

( * ) Notice: Subject to any disclaimer, the term of this patent is extended or adjusted under 35 U.S.C. 154(b) by 497 days.

(21) Appl. No.: 12/377,244

(22) PCT Filed: Aug. 9, 2007

(86) PCT No.: PCT/US2007/017742
§ 371 (c)(1),
(2), (4) Date: Feb. 11, 2009

(87) PCT Pub. No.: WO2008/021202
PCT Pub. Date: Feb. 21, 2008

(65) Prior Publication Data
US 2010/0178650 A1    Jul. 15, 2010

Related U.S. Application Data

(60) Provisional application No. 60/837,347, filed on Aug. 11, 2006.

(51) Int. Cl.
*G02B 21/06* (2006.01)
(52) U.S. Cl.
CPC ..................................... *G02B 21/06* (2013.01)
USPC ......................................... 359/385; 600/156
(58) Field of Classification Search
None
See application file for complete search history.

(56) References Cited

U.S. PATENT DOCUMENTS

| 4,601,551 | A |   | 7/1986  | Pettingell et al. |
|-----------|---|---|---------|-------------------|
| 4,902,132 | A |   | 2/1990  | Murphy, Jr. et al. |
| 5,009,503 | A |   | 4/1991  | Murphy, Jr. et al. |
| 5,095,213 | A |   | 3/1992  | Strongin |
| 5,105,305 | A |   | 4/1992  | Betzig et al. |
| 5,211,805 | A |   | 5/1993  | Srinivasan |
| 5,272,330 | A | * | 12/1993 | Betzig et al. .................. 250/216 |
| 5,288,996 | A | * | 2/1994  | Betzig et al. ............. 250/227.26 |
| 5,296,700 | A |   | 3/1994  | Kumagai |
| 5,568,582 | A |   | 10/1996 | Rajic et al. |
| 5,602,674 | A |   | 2/1997  | Weissman et al. |
| 5,627,922 | A | * | 5/1997  | Kopelman et al. .............. 385/12 |
| 5,741,412 | A |   | 4/1998  | Dovichi et al. |
| 5,766,435 | A |   | 6/1998  | Liao et al. |
| 5,802,925 | A |   | 9/1998  | Kanao |
| 5,976,896 | A |   | 11/1999 | Kumar et al. |
| 5,986,256 | A |   | 11/1999 | Yagi |
| 6,063,629 | A |   | 5/2000  | Knoblauch |
| 6,195,203 | B1 |   | 2/2001  | Kadogawa |
| 6,262,837 | B1 |   | 7/2001  | Nagano et al. |
| 6,271,045 | B1 |   | 8/2001  | Douglas et al. |
| 6,304,355 | B1 |   | 10/2001 | Farnworth |
| 6,411,433 | B1 |   | 6/2002  | Miyoshi |

(Continued)

OTHER PUBLICATIONS

PCT/US07/17742 International Search Report and Written Opinion.

*Primary Examiner* — Derek S Chapel
(74) *Attorney, Agent, or Firm* — Gates & Cooper LLP

(57) ABSTRACT

The present invention relates to a capillary-based cell and tissue acquisition system that integrates the capillary approach with a microscope manipulator to collect and sort cells of interest. Cells of interest are determined by using a laser beam focus to identify the initial contact between the capillary and the cells.

21 Claims, 4 Drawing Sheets

(56) References Cited

U.S. PATENT DOCUMENTS

| | | |
|---|---|---|
| 6,517,779 B1 | 2/2003 | Luttermann et al. |
| 6,544,474 B2 | 4/2003 | Douglas |
| 6,555,784 B2 | 4/2003 | Iehisa et al. |
| 6,563,632 B1 * | 5/2003 | Schoeppe et al. ............. 359/368 |
| 6,563,635 B2 | 5/2003 | Nishida et al. |
| 6,639,657 B2 | 10/2003 | Baer et al. |
| 6,643,436 B2 | 11/2003 | Flatt |
| 6,679,837 B2 | 1/2004 | Daikuzono |
| 6,697,149 B2 | 2/2004 | Baer et al. |
| 6,712,527 B1 | 3/2004 | Chan et al. |
| 6,761,713 B2 | 7/2004 | Teichmann |
| 6,768,122 B2 | 7/2004 | Dong et al. |
| 6,788,458 B2 | 9/2004 | Nishida et al. |
| 6,813,071 B2 | 11/2004 | Takahama |
| 6,852,527 B2 | 2/2005 | Chan et al. |
| 6,897,038 B2 | 5/2005 | Bonner et al. |
| 6,906,859 B2 | 6/2005 | Nihoshi et al. |
| 6,908,461 B2 | 6/2005 | Momiuchi et al. |
| 6,940,640 B2 | 9/2005 | Sukekawa et al. |
| 7,008,416 B2 | 3/2006 | Sakaguchi et al. |
| 7,012,676 B2 | 3/2006 | Baer et al. |
| 7,019,895 B2 | 3/2006 | Russum et al. |
| 7,022,118 B2 | 4/2006 | Ariura et al. |
| 7,066,657 B2 | 6/2006 | Murali et al. |
| 7,214,299 B2 | 5/2007 | Armstrong |
| 7,224,524 B2 | 5/2007 | Tsuchiya et al. |
| 7,235,373 B2 | 6/2007 | Dunlay et al. |
| 7,857,756 B2 * | 12/2010 | Warren et al. ................. 600/159 |
| 2005/0012990 A1 | 1/2005 | Otaki et al. |
| 2005/0181132 A1 | 8/2005 | Mirkin et al. |
| 2005/0236566 A1 | 10/2005 | Liu |
| 2005/0254046 A1 | 11/2005 | Matsuoka et al. |
| 2005/0270542 A1 | 12/2005 | Sullivan et al. |
| 2005/0287012 A1 | 12/2005 | Govyandinov et al. |
| 2006/0030787 A1 | 2/2006 | Quay |

\* cited by examiner

CAPILLARY-BASED CELL AND TISSUE ACQUISITION SYSTEM (CTAS)

CROSS REFERENCE TO RELATED APPLICATIONS

This application claims the benefit of U.S. provisional patent application No. 60/837,347, filed Aug. 11, 2006, the entire contents of which are incorporated herein by reference.

FIELD OF THE INVENTION

The invention described herein relates to a capillary-based cell and tissue acquisition system (CTAS).

BACKGROUND OF THE INVENTION

Genomic and proteomic technologies play an important role in drug discovery, molecular diagnostics and practice of medicine in the post-genomic era—the first decade of the 21st century. Analysis of different levels of gene expression in healthy and diseased tissues by proteomic/genomic approaches is as important as the detection of mutations and polymorphisms at the genomic level and may be of more value in designing new therapies. Cell specific proteomic and genomic studies require highly reliable and preferably low cost technology that allows separating specific cell types from normally heterogeneous tissues such as brain tissue.

Cell specific sorting/capture technology is a prerequisite for precise characterization of the specific cell types for understanding their function, regulation of the metabolism and drug testing. There are two main types of devices for isolation of specific cell types laser-capture microdissection (LCM) and fluorescence assisted cell sorting (FACS). Besides the high cost of these devices, each of them has specific limitations. LCM performs cell and tissue collection using fixed tissues that often affects the quality of biological material such as RNA. FACS requires fluorescent labels and works with dissociated cells. It is very difficult to dissociate adult tissues without significant cell damage (e.g. Lobo et al., Nat Neurosci. 2006 Mar.; 9(3):443-52. Epub 2006 Feb. 19).

SUMMARY OF THE INVENTION

The present invention comprises a capillary-based cell and tissue acquisition system (CTAS): simple, non-invasive (does not require tissue fixing and drying) technology that can be easily automated and offers wide range of cell- and tissue-specific separation parameters. In addition, it is estimated to be significantly cheaper than any existing devices such as LCM or FACS. Cost-effective CTAS with high level of integration and featuring open system architecture will play a key role in collection and processing of data in biomedical Other applications that can take advantage of this technology include a new generation of medical tissue processing equipment. This technology can be beneficial for the academic community, drug and biomarker discovery industry and healthcare system. The CTAS concept has high flexibility that enables "tailoring" for specific design and development applications. Interchangeable CTAS can be adaptable to various types of experiments.

The CTAS can be commercialized. The application range of the resulting products can be large. The next generation of drug discovery and biomarker identification experiments, widely used by pharmacological industry and academic institutions, and a variety of medical applications can benefit from this product. A new CTAS can be a critical component for future genomic and functional studies. The compact size, low cost and interchangeable block design features of the system allows for easy system integration and drastically improves the reliability of the next generation of cell and tissue specific work. experimental designs and environments used in industry, academia or healthcare systems.

The benefits of this approach are tremendous. For example, low cost of CTAS allows collection of specific cell types and tissues for any research laboratory or medical institute without significant investments, as well as to reduce the amount of tissue sections used therefore, reducing the number of experimental animals. Some of the technical advantages of the capillary-based CTAS apparatuses and methods disclosed herein include: 1) it does not require tissue dissociation or fixation, 2) it works on live tissue materials, a feature which permits the collection of specific cells for in vitro culturing or analysis (e.g. adult stem cells), 3) it is easily attached to virtually any inverted microscope when needed; 4) it is compact, 5) it is a modular system composed of interchangeable elements or blocks.

This is a simple and cheap way of collecting desired tissues or cells when proper size of capillary is used. It can be used on live tissues, fresh frozen tissues or fixed. It can be integrated with GFP recognition unit allowing collection of genetically labeled cells. It is cheap, so any research group or laboratory can afford it therefore the market for this instrument is big. Briefly, when properly optimized it will provide similar capabilities of LCM or FACS but with lower costs, less limitations and user-friendlier environment.

DETAILED DESCRIPTION OF THE INVENTION

Figure 1:
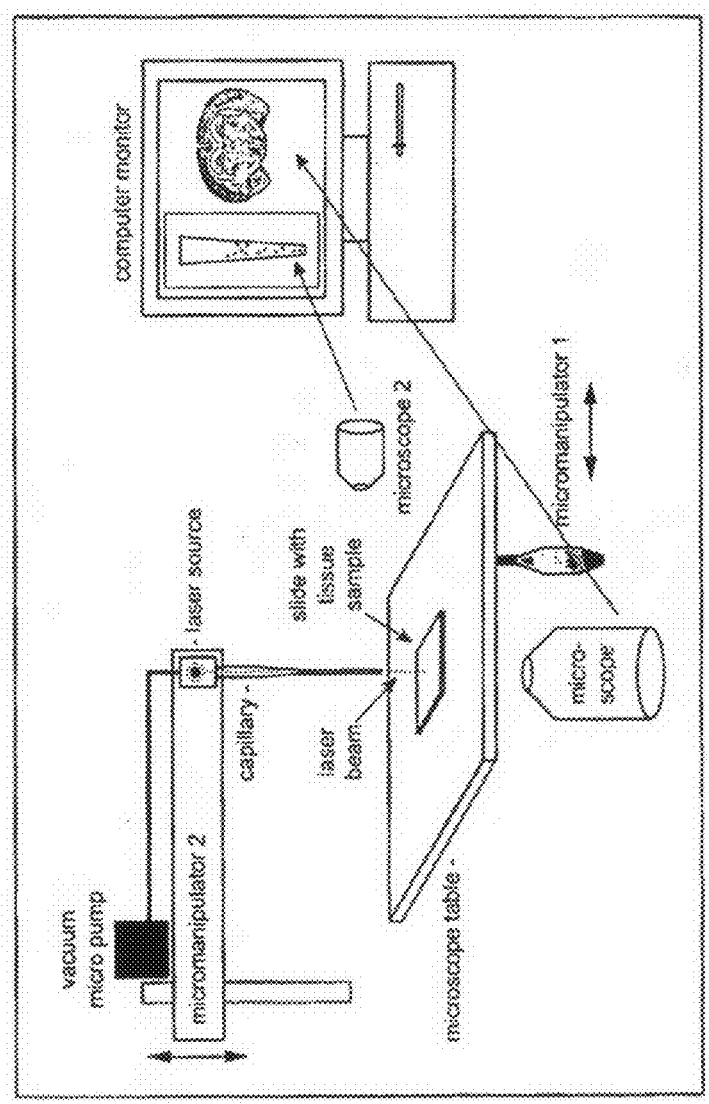
FIG. 1 provides a schematic representation of an embodiment of the instrument with some elements of the system. The invention comprises permutations and combinations of these interchangeable elements or blocks. System elements in this embodiment include: 1) a glass capillary tube for cell and tissue collection, 2) a capillary holder having connectors for a fiberoptic cable and vacuum pump conduit; 3) a fiberoptic cable with laser source for illuminating the tip of capillary, 4) a vacuum pump with pneumatic controller for suction of cells and tissue, 5) an inverted microscope, 6) a micromanipulator, 7) a digital camera for visual control of the area where cell or tissue is selected. Some of these elements are shown in FIG. 1.
Figure 2:
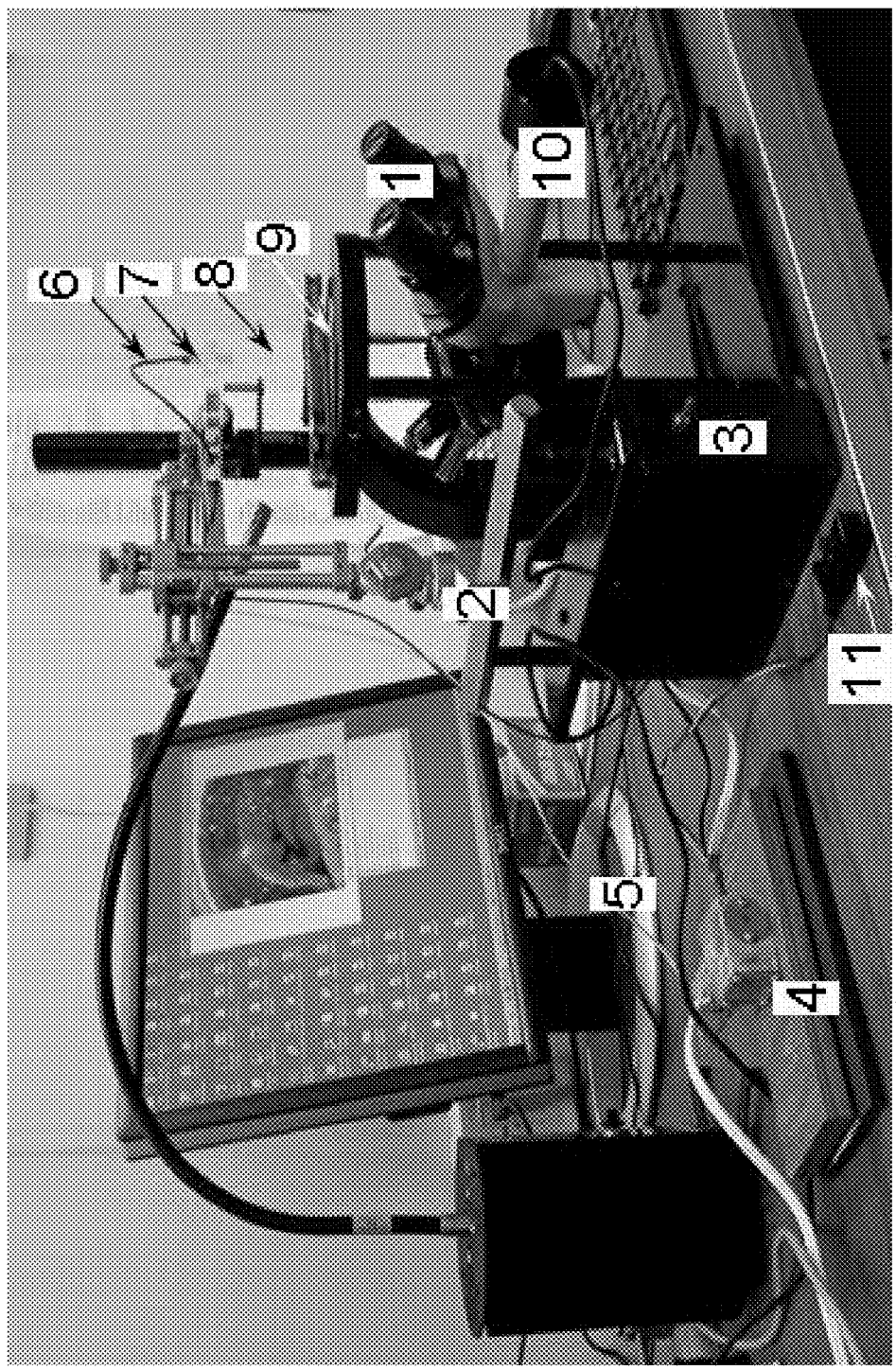
FIG. 2 provides an overview an embodiment of the present invention. Numbers indicate the following: 1—microscope; 2—micromanipulator, 3—box with laser, power supplies for laser and vacuum pump, 4—vacuum pump, 5—vacuum tube between vacuum pump and glass capillary; 6—fiberoptic cable, 7—glass capillary holder, 8—glass capillary, 9—brain section on the glass slide, 10—digital camera, 11—button controlling suction of samples.

Unless otherwise defined, all terms of art, notations and other scientific terminology used herein are intended to have the meanings commonly understood by those of skill in the art to which this invention pertains. In some cases, terms with commonly understood meanings are defined herein for clarity and/or for ready reference, and the inclusion of such definitions herein should not necessarily be construed to represent a substantial difference over what is generally understood in the art. The techniques and procedures described or referenced herein are generally well understood and commonly employed using conventional methodology by those skilled in the art. As appropriate, procedures involving the use of commercially available kits and reagents are generally carried out in accordance with manufacturer defined protocols and/or parameters unless otherwise noted.

"Microscope" as used herein is an inverted microscope or a standard microscope as is known in the art. An inverted microscope can be a microscope in which the body, ocular, and objective are located underneath the microscope stage (the small platform on a microscope where the specimen is mounted for examination). The specimen can be placed face-down over the objective and can be lit from above (see, e.g., U.S. Pat. Nos., 7,012,676, 6,940,640, 6,813,071, 6,697,149, 6,639,657, the contents of which are herein incorporated by reference). Generally, microscopes have one or more microscope stages/tables or translation stages. Micromanipulators can be coupled to the microscope and/or to the microscope stage to move the microscope stage in the x-y directions for example. The microscope stage can have a number of different stage inserts for example for use with petri dishes, glass slides, standard size multiwell plates, and the like. A digital camera or the like can be used to visualize the specimen as is known in the art. The digital camera for example can be freestanding or coupled to the microscope.

"Vacuum pump" as used herein refers to vacuum micropumps or vacuum pumps (see, e.g., U.S. Patent Application #20050287012, the contents of which are herein incorporated by reference). Vacuum pumps can be diaphragm micropumps or the like.

"Fiber optic cable" is a fiber that transmits light signals. A fiber optic cable can be a single mode cable or a multimode cable. The multimode cable comprises step-index multimode fiber or graded-index multimode fiber or the like. Single mode cable can be a mono-mode optical fiber, single-mode fiber, single-mode optical waveguide, or a uni-mode fiber. Fiber optic cables can comprise glass fibers or POF, a plastic-based material for example (see, e.g., U.S. Pat. No. 6,712,527 and U.S Patent Application 20050270542, the contents of which are herein incorporated by reference). The fiber optic cable of the present invention can be located within the capillary, outside of the capillary, or contiguous with the capillary for example.

"Light source" as used herein comprises a laser, a laser source, laser carrier signal, light signal, optic signal, a light-emitting diode (LED), gas lasers, or diode lasers for example. Lasers can also be ruby lasers, carrier wave lasers, chemical lasers, excimer lasers, solid-state lasers, dye lasers, vertical cavity surface emitting lasers, edge-emitting lasers, mode-locked fiber lasers, high-power fiber lasers and amplifiers, semiconductor lasers (see, e.g., U.S. Pat. Nos. 5,211,805, 7,066,657, 6,304,355, and 6,555,784, the contents of which are herein incorporated by reference). The light source of the present invention can be coupled to the capillary, capillary holder, microscope, or freestanding for example depending on the particular application.

A laser (from the acronym Light Amplification by Stimulated Emission of Radiation) for example is an optical source that emits photons in a coherent beam. Laser light is typically nearly monochromatic, i.e. consisting of a single wavelength or color, and emitted in a narrow beam. The use of a laser is known in the art (see, e.g., U.S. Pat. Nos. 6,679,837, 6,761, 713, 6,908,461, 7,022,118, 7,008,416, the contents of which are herein incorporated by reference). Typical lasers comprise argon fluoride, krypton fluoride, xenon chloride, nitrogen, argon (blue), or argon (green) lasers. Lasers used in the present invention can be of a strength that keeps cells/tissue intact. Embodiments of the present invention comprise lasers of an emission wavelength (or sources of laser light) that do not tear tissue/cells. Lasers of different wavelengths for example can be used in certain embodiments of the invention.

The light source can be pulsed on and off in various tune increments depending on the specimen for example short pulses of light can be used with dense specimens (see, e.g., U.S. Pat. No. 6,897,038, the contents of which are herein incorporated by reference). Lasers can be used in conjunction with light strengtheners, such as repeaters, used to refresh the signal or with modulators used to generate light signals (see, e.g., U.S. Pat. No. 6,643,436, the contents of which are herein incorporated by reference).

"Fluorophore", "fluorescent tag" or "fluorescent label" refers to a chemical compound, which when excited by exposure to a particular wavelength of light, emits light (i.e., fluoresces), for example at a different wavelength. In certain embodiments of the present invention for example cells can be tagged with the fluorophores or the like. Fluorophores are described in terms of their emission profile, or "color." Green fluorophores, for example Cy3, FITC, and Oregon Green, are characterized by their emission at wavelengths generally in the range of 515-540λ. Red fluorophores, for example Texas Red, Cy5 and tetramethylrhodamine, are characterized by their emission at wavelengths generally in the range of 590-690λ. Other suitable fluorophores include GFP (green fluorescent protein), Lissamine, diethylaminocoumarin, fluorescein chlorotriazinyl, naphthofluorescein, 4,7-dichlororhodamine and xanthene and derivatives thereof. Other fluorophores known to those skilled in the art may also be used (see, e.g., U.S. Pat. No. 6,969,615, the contents of which are herein incorporated by reference).

"Conduit" as used herein comprises a capillary, glass capillary, collecting tube, capture tube, or a nanopipette for example (see, e.g., U.S. Pat. No. 6,063,629, the contents of which are herein incorporated by reference). Conduits are constructed out of a variety of materials known in the art, including, but not limited to, glass, or specifically borosilicate glass, aluminium silicate glass or haematocrit glass (see, e.g., U.S. Pat. No. 6,517,779, the contents of which are herein incorporated by reference). The conduit can be open at both ends and coupled to a capillary holder. Typically, the conduit is a capillary tube (a tube of small internal diameter capable of holding a liquid by capillary action). The capillary tube can be of various lengths and diameters depending on the application. Once aspirate is collected in the glass capillary tube for example the glass capillary can be removed from the capillary holder, and a pipette bulb can be used to transfer the captured cells into a microfuge tube or other suitable container. One or a series of capillary tubes can be used according to the methods of the invention for example for automation (see, e.g., U.S. Pat. Nos. 4,902,132, 5,009,503, and U.S. Patent Application Nos: 20050254046, 20050236566, 20050181132, the contents of each of which are herein incorporated by reference).

"Focused capillary" as used herein refers to a capillary whose tip is illuminated by the projection of a light source for example a laser beam. The focused capillary for example can be visualized via a digital camera and can be used to determine the precise location of cells to collect.

"Micromanipulators" comprise microscope micromanipulators, microscope adapters or the like. Microscope manipulators and their methods of use are known in the art for example, use of micromanipulators with the inverted-design microscope is known in the art (see, e.g., U.S. Pat. Nos. 4,762,405 4,749,270 5,057,100, the contents of which are herein incorporated by reference). Typically, micromanipulators are coupled to microscopes, inverted microscopes, microscope stages, translation stages, capillary, or capillary holders for example and can move these objects in one or more directions. Micromanipulators can be motor-driven, manual, a combination of motor-driven and manual, or piezo-electric-driven (see, e.g., U.S. Pat. No. 5,688,262, the contents of which are herein incorporated by reference). The micromanipulator can be controlled by a joystick, mouse, human, actuator, or liquid-operated, such as with hydraulic pressure, i.e., oil pressure (see, e.g., U.S. Pat. No. 5,845,541, the contents of which are incorporated by reference). The joystick can be capable of manipulating several axis at one time for example in the x, y, and z directions. They can also be used with a computer software program that is enabled to remember a number of position coordinates from previous procedures and that robotically repeats the same positioning sequence (see, e.g., U.S. Pat. Nos. 6,769,194, 6,411,433 5,109,724 5,219,347 5,325,010 5,476,357 5,651,574 5,688, 262, 5,886,684 5,973,471 5,918,507, 5,890,863, 6,603,239, U.S. Patent Application No. 20040056751, the contents of which are herein incorporated by reference).

Additionally, the invention can be adapted for use in high throughput systems as is known in the art for example using a robot or via automation (see, e.g., U.S. Pat. Nos. 7,027,133, 6,870,625, 6,690,470, U.S. Patent Application No. 20060050376, 20050041861 20060114456, and 20050089949, the contents of which are herein incorporated by reference). A robotic arm, for example, can be used to rotate one or more glass capillary tubes for collection capture or sorting (see, e.g., U.S. Pat. No. 6,148,680, the entire contents of which are herein incorporated by reference). The capillary holder can have more than one connecting for connecting more than one capillary. The ball bearing for example can have multiple connectors for connecting multiple capillary holders and capillaries. Each capillary can capture for example a different cell or cell type. The capillary tubes can be rotated for example via the micromanipulators. Microfuge tubes for collection of cells can be used to automate the process also.

"Biological material" or biological specimen as used herein, comprise tissues, tissue sections, cells, or subcellular organelles or the like. Tissue sections can be for example but not limited to the range of 10 to 100 µm. Tissue sections can be fresh, fresh frozen, or fixed depending on experimental design and needs. The biological material can comprise cells labeled with a fluoropore or fluorescent marker if the CTAS is equipped for recognition of a specific label Tissue sections do not need to be fixed, and cells do not need to be disassociated for practicing the invention. The biological material can be placed in a biological material holder or a biological specimen holder and these can comprise microscope slides, petri dishs, microtiter plates such as 96-well and 384-well microtiter plates, or the like.

The system as described herein is an interchangeable block system wherein various blocks or elements can be added or subtracted from the system depending on need and application. Embodiments of the invention described below are illustrative examples of the various permutations and combinations of blocks.

Two or more micromanipulators for example can be used in the system. A first micromanipulator can be used for example to move the microscope table in the x-axis direction (i.e., horizontally), and a second micromanipulator can be coupled to the glass capillary or the glass capillary holder for example to move the glass capillary in the y-axis direction (i.e., vertically). Another micromanipulator can be used to move either the glass capillary or the microscope table in the z-axis direction, or alternatively, one micromanipulator can be used to move the glass capillary for example in more than one direction.

Embodiments of the system described herein include more than one microscope. A first microscope for example can be inverted and used to visualize the biological specimen from the underside (below the microscope table). A second microscope that is not inverted can be used to visualize the biological specimen and/or the contents of the glass capillary (perhaps after aspiration) from above the microscope table. Various components known in the art can be added/subtracted from the microscope depending on the application. A digital camera for example can be coupled to the microscope. The digital camera can be used to visualize the illuminated capillary tip and to aid in placement of the illuminated capillary tip to the exact location on the biological specimen wherein cells are to be collected. The digital camera, however, does not need to be coupled to the microscope. Various types of microscopes can be used as is known in the art, such as, for example, microscopes for visualizing single cells or dissection, compound, scanning electron, or transmission electron microscopes.

Some embodiments of the cell and tissue acquisition system can comprise more than one light source. The light sources can be of different emission wavelengths for example. A diode that emits light of a first wavelength that does not cut through the cells for example can be used for illuminating the capillary tip while another light source that emits light of a second wavelength be used to cut through dense tissue to capture the cells of interest.

Various computer systems for visualizing the specimen or the illuminated capillary tip for example can be used in the interchangeable block system. A computer monitor could be attached to the apparatus to visualize the specimen. Various data programs and/or software could be used to organize the data, for example, the images of the specimens as is known in the art.

The blocks can be adapted for use in high-throughput or automated applications for example. More than one capillary for example can be used for collecting more than one sample. One or more vacuum micro pumps/vacuum tubes can be used to provide suction for the samples. Vacuum pumps and/or vacuum micro pumps can be used depending on the application. Alternatively, a vacuum manifold can be used in conjunction with the vacuum pump as is known in the art for aspiration of more than one sample at a time. Various vacuum adapters/connectors or other components can be used depending on the application. In certain embodiments, the glass slide is held in place via a vacuum so it will stay in place when the stage is manipulated for example (see, e.g., U.S. Pat. No. 6,697,149, the contents of which are herein incorporated by reference).

The block system additionally allows for capturing cells from a variety of different sources. Cells can be captured directly from the microscope slide or petri dish for example. A transfer film is not needed, and the laser light is used to illuminate the capillary tip rather than to polymerize the transfer film. Tissue does not need to be fixed, and cells do not need to be dissociated.

Additionally, various mechanical elements can be used to connect various blocks in the system. Ball bearing with connectors or an actuator for example can be used to connect the capillary, capillary holder, micromanipulator, fiber optic cable and vacuum pump tube for example.

Biological material collected (i.e., cells) can be used for downstream applications comprising DNA/RNA isolation, genomics, microarray analysis, or proteomics such as MALDI mass spec analysis. Results of the genomic and/or proteomic characterizations for example can be used to determine gene or protein expression in normal vs. cancer cells as is known in the art (see, e.g., U.S. Pat. No. 6,531,318, the entire contents of which are herein incorporated by reference).

Optionally, labeled samples can be used for example fluorecently-labeled samples can be used with the methods of the invention. Cells of interest can be labeled with a fluorescent marker such as GFP as is known in the art. A source of fluorescent excitation can be applied, wherein an excitation beam emitted by the source is of an intensity and is of a wavelength to excite a fluorescent label associated with the labeled tissue sample. The labeled cell/tissue of interest can thereafter be collected via the methods disclosed herein (see, e.g., U.S. Pat. No. 6,790,636, the entire contents of which are herein incorporated by reference).

Exemplary Methods of the Invention

Figure 3:
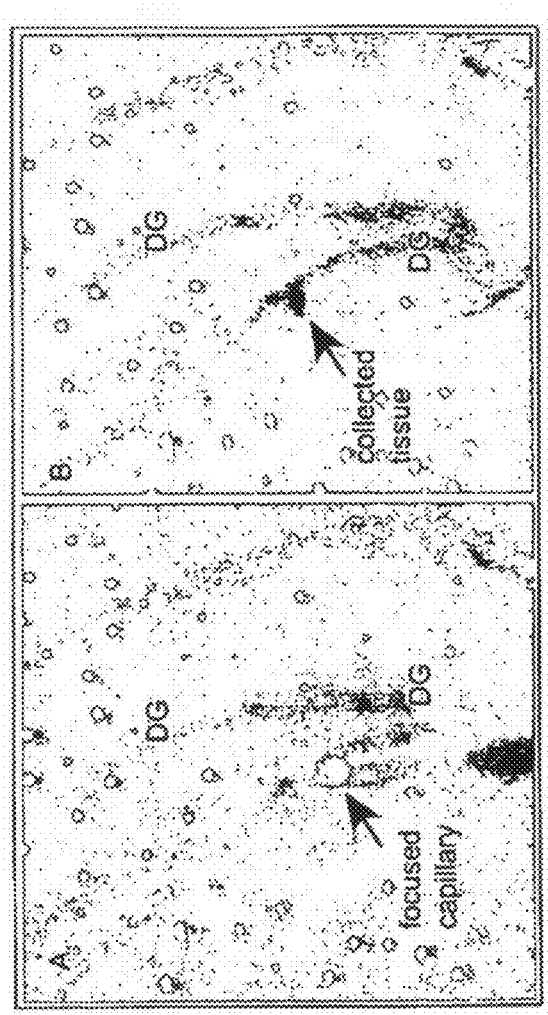
FIG. 3 shows testing of the CTAS.
Figures 3A, 3B:
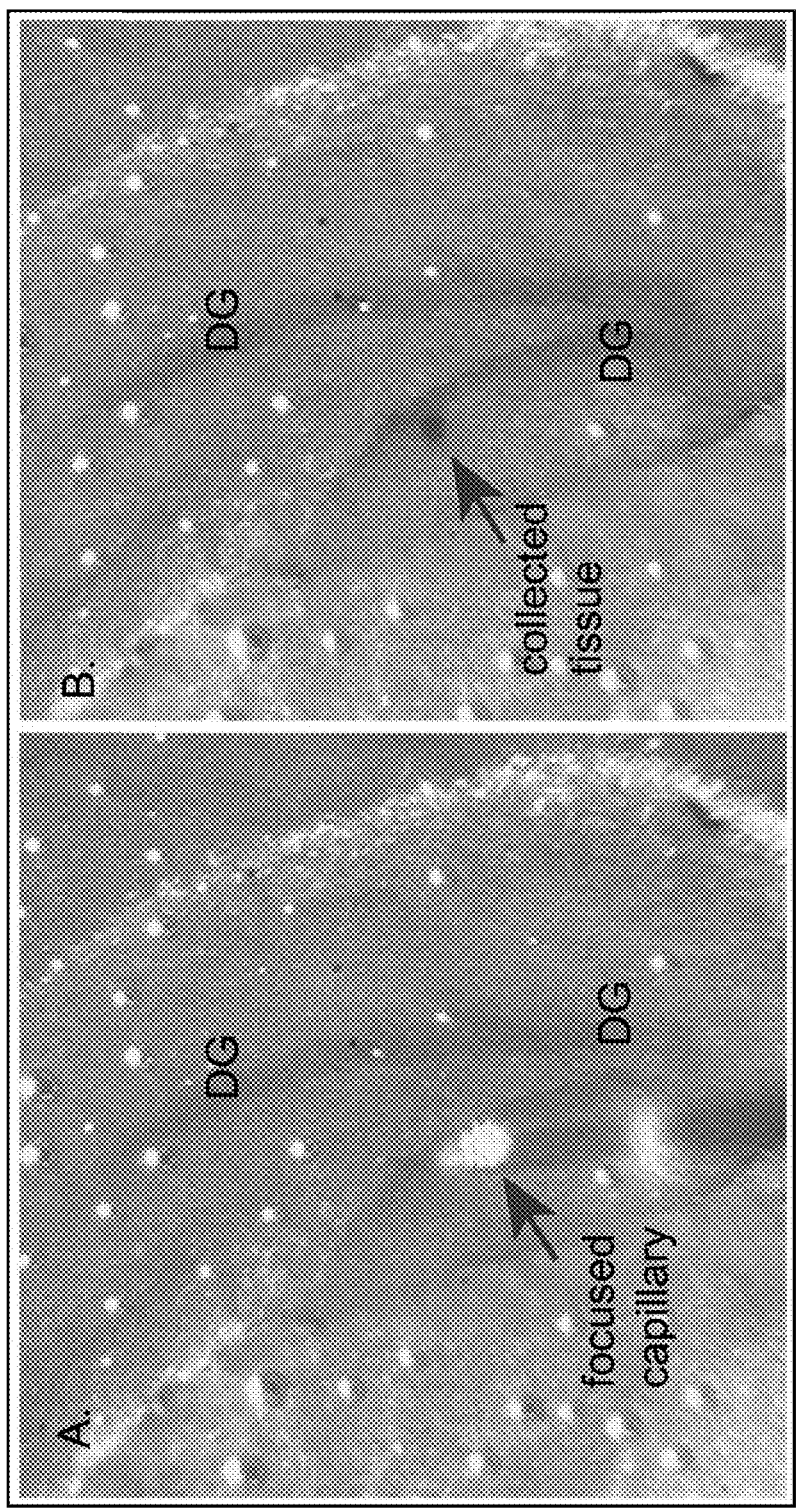
FIG. 3A shows dentate gyrus selected for collection. Arrow shows the projection of laser beam indicating the place of capillary contact with tissue section.
FIG. 3B shows a black gap (indicated with an arrow) showing the place where tissue was collected.

Methods of the invention integrate the capillary approach with the microscope manipulator to successfully collect desired tissue sections or cells (see, e.g., FIG. 3) and collected cells can be used for example for RNA or protein isolation. The point of initial contact between collection device (capillary) and a tissue surface can be identified by using laser beam focus. Fresh tissue can be used with the methods of this invention and the duration of time when fresh tissue can be used without significant decomposition can be estimated. Methods of the invention also allow for automation and/or robotics.

Cells and tissues can be collected from tissue sections ranging from 10 to 100 nm. Tissue sections can be fresh, fresh frozen or fixed depending on the experimental design and needs.

Tissue sections can be placed on a microscope slide directly without fixation. A light beam can be transmitted via a fiber optic cable to a glass capillary, illuminating the capillary tip for example. The illuminated capillary tip can be seen via a digital camera, and the illuminated capillary tip can be moved via a micromanipulator to right above the location of cells to be captured and/or sorted. The capillary can then be lowered via the micromanipulator to contact the cells to be captured, and a button can be pressed to apply the vacuum and suction the cell(s) in the precise location. The aspirate can be collected from the glass capillary using a pipette bulb or other methods as is known in the art.

Collected material can be used for all downstream applications including, RNA, DNA and protein isolation, proteomics and genomics studies etc. Fluorescent-labeled cells can be collected too, if CTAS is equipped for recognition of a specific label.

EXAMPLES

Dentate gyrus can be collected from the rats with chronic seizures and normal control. The tissue can be used for RNA isolation, amplification and labeling. Labeled cRNA can be used in microarray experiments and identified genes can be overlaid with known set of seizure specific biomarkers to demonstrate specificity and relevance of findings.

Adult neural progenitors from ventricular zones and dentate gyrus can be collected and used in cell culture experiments. The results can be used to demonstrate that the stem cell cultures collected from the instant invention are more enriched for neural progenitors than if using standard dissection approach.

Motor neurons form spinal cords of mouse model of amyotrophic lateral sclerosis can be collected according to the methods of this invention and used in microarray experiments. These data can be compared to the results obtained from laser-captured cells.

Moreover, GFP labeled neurons from models of GFP transgenic animals available from GENSAT can be collected using the methods of the invention.

Further Embodiments of the Invention

An embodiment of the invention is a cell and tissue acquisition system comprising a microscope, a microscope stage coupled to the microscope, a laser source, a capillary, a capillary holder coupled to the capillary, a first micromanipulator coupled to the capillary holder, a second micromanipulator coupled to the microscope stage, a micro vacuum pump, a ball bearing with connectors coupled to the capillary holder, a fiber optic cable connecting the laser source to the ball bearing with connectors, a vacuum pump tube connecting the micro vacuum pump to the ball bearing with connectors, a capillary tip contiguous with the capillary, and a computer monitor for visualization of the specimen; wherein the laser is used to indicate the place of capillary contact with cells and the vacuum micropump is used to aspirate said cells. Typically, the first micromanipulator holds the capillary right above the microscope stage; optionally, a stand can be used. A laser beam generated by the laser source is carried by the fiber optic cable. In certain embodiments, the fiber optic cable is contained within the capillary. In other embodiments, the fiber optic cable is outside of the capillary. The capillary tip can be illuminated by the laser source. The capillary tip that is illuminated can be displayed on the computer monitor and can be used for indicating the location of the capillary tip with respect to the tissue sample. Preferably, the microscope is an inverted microscope. Optionally, a second microscope is used to magnify the specimen from above the microscope stage or to magnify the contents of the glass capillary for example. The laser source can be coupled to the capillary, capillary holder, the micromanipulator, be freestanding or contained within a box for example. In certain embodiments, the capillary and capillary holder can be held over the microscope stage via a stand and/or via the micromanipulator.

Another embodiment of the invention is an apparatus comprising a microscope, a microscope stage contiguous with the microscope, a micromanipulator, a conduit, a conduit holder between the conduit and the micromanipulator, a micro vacuum pump, and a light source wherein the conduit collects, captures, or sorts cells via aspiration. The conduit, conduit holder, and micromanipulator can be coupled to the microscope, coupled to a stand, or freestanding. The invention can comprise a second micromanipulator coupled to the microscope or to the microscope stage. Typically, a fiber optic cable is connected on a one end to the light source and on a second end to a ball bearing with connectors. The apparatus further comprises a vacuum tube. Typically, the vacuum tube is between the ball bearing with connectors and the micro vacuum pump. A fiber optic cable can be used to transmit data such as digital signals from the laser source to the conduit. The fiber optic cable comprises one or more fibers. A power supply can be used to supply power to the laser source and/or the vacuum pump. The apparatus can further comprise a biological sample holder on the microscope stage wherein the biological sample holder comprises a biological sample. A button that is either manually or automatically operated can be used to operate the micro vacuum pump. The invention further comprises a computer, a computer monitor, a digital camera, a computer software for data collection and/or visualization of the biological sample or any other device used to visualize the biological sample or to collect and/or organize data.

An illustrative embodiment of the invention is an interchangeable block system comprising a capillary, a capillary holder coupled to the capillary, a micromanipulator coupled to the capillary holder, a microscope, a laser, and a fiber optic cable between the laser and the capillary; wherein the capillary is used for cell and tissue collection. In a preferred embodiment the microscope is an inverted microscope. The inverted microscope can be used to magnify the contents of a tissue or cell sample. The invention further comprises a vacuum pump connected to the capillary holder via a vacuum pump tube. In a preferred embodiment, the capillary collects cells and tissues via aspiration. In one embodiment, the micromanipulator moves in the x, y, and z directions. In other embodiments, the micromanipulator coupled to the capillary holder moves vertically. In this embodiment, the interchangeable block system can further comprise a second micromanipulator coupled to the microscope. The second micromanipulator can for example move a microscope stage horizontally. In a highly preferred embodiment, the laser is not used to polymerize a transfer film. In some embodiments, cells to be collected are not fixed. Typically, the capillary is composed of glass. In preferred embodiments, the laser source can be used to identify initial contact between the conduit and a tissue or cell surface. Typically, a digital camera can be used for visual control of the area where cell or tissue is selected. A computer can be used to project the image.

Another embodiment of the invention is a method of collecting biological material comprising using a laser source to illuminate a tip of a capillary and aspirating said biological material into the capillary wherein the capillary is controlled by a micromanipulator. The biological material can be fresh, fresh frozen, or fixed. In preferred embodiments, the biological material comprises cells. In highly preferred embodiments, the cells are not disassociated. The aspirate can be used for polynucleotide or protein isolation. Specifically, the aspirate can be used for RNA isolation.

Yet another embodiment of the invention is a method of collecting biological material of interest comprising projecting a laser beam through a conduit to identify the biological material of interest and aspirating said biological material into the conduit. Typically, the laser beam indicates the place of capillary contact with the biological material. The biological material can be projected onto a computer monitor.

Other objects, features, and advantages of the present invention will become apparent to those skilled in the art from the detailed description. It is to be understood, however, that the detailed description, while indicating some embodiments of the present invention are given by way of illustration and not limitation. Many changes and modifications within the scope of the present invention may be made without departing from the spirit thereof, and the invention includes all such modifications.

What is claimed:

1. An apparatus for the microscopic collection of a biological sample comprising:
    a microscope stage;
    a capillary tube having a first end comprising a collection orifice adapted to collect a material in the biological sample and a second end adapted to connect to a vacuum source;
    a capillary tube holder operably coupled to the capillary tube;
    a micromanipulator operably coupled to:
        the capillary tube holder; or
        the microscope stage;
    a light source adapted to direct a beam of light to the first end of the capillary tube;
    wherein the light source directs the beam of light along the longitudinal axis of the capillary tube to the collection orifice at the first end of the capillary tube so that light is localized at the first end of the capillary tube so as to form an area of illumination at the first end of the capillary tube consisting essentially of light emitted by the light source which indicates the site of capillary tube collection of the material in the biological sample.

2. The apparatus of claim 1, wherein the apparatus is operably coupled to at least one of the following components:
    a microscope;
    a second micromanipulator operably coupled to the capillary tube holder or the microscope stage;
    a vacuum conduit having a first conduit end adapted to connect to the second end of the capillary tube and a second conduit end adapted to connect to a vacuum pump;
    a vacuum pump;
    a laser or light emitting diode (LED) light source;
    a camera; or
    a computer monitor.

3. The apparatus of claim 2, wherein the vacuum pump provides the vacuum source for the second end of the capillary tube and further wherein the vacuum source is used to aspirate a material from the biological sample in to the capillary tube.

4. The apparatus of claim 2, wherein the microscope is an inverted microscope.

5. The apparatus of claim 2, wherein the second micromanipulator controls the movement of the capillary tube.

6. The apparatus of claim 1, further comprising a vacuum pump operably coupled to the second end of the capillary tube and having a pneumatic controller that controls the amount of suction applied to the second end of the capillary tube.

7. The apparatus of claim 1, further comprising a fluorescent imaging device adapted to capture images of a fluorescently labelled material within the biological sample.

8. The apparatus of claim 1, wherein the apparatus is in a modular configuration that allows the microscope stage, the capillary tube, the capillary tube holder, the micromanipulator or the fiber optic cable to be replaced independently of other components of the apparatus.

9. The apparatus of claim 1, wherein the first end of the capillary tube is adapted to collect a cell, a protein or a nucleic acid in the biological sample.

10. A method of collecting a material in a biological sample comprising:
    projecting a beam of light from a light source along the longitudinal axis of a capillary tube having a first end comprising a collection orifice adapted to collect a material in the biological sample, wherein the beam of light is localized to the collection orifice at the first end of the capillary tube so as to illuminate the collection site for a material in the biological sample by forming an area of illumination on the collection orifice, wherein the area of illumination consists essentially of light emitted by the light source;
    visualizing the illuminated collection orifice of the capillary tube via a microscope, moving the capillary tube relative to the biological sample via a micromanipulator so as to dispose the collection orifice at a material collection site in the biological sample, and aspirating said material into the capillary tube so that the material in the biological sample is collected.

11. The method of claim 10, wherein the collected material is not fixed.

12. The method of claim 10, wherein the collected material includes a live cell.

13. The method of claim 10, wherein the method is performed using an apparatus comprising:
a microscope stage;
the capillary tube having the first end comprising a collection orifice adapted to collect a material in the biological sample and further including a second end adapted to connect to a vacuum source;
a capillary tube holder operably coupled to the capillary tube;
a micromanipulator operably coupled to:
the capillary tube holder; or
the microscope stage; and
a fiber optic cable adapted to direct light from a light source to the collection orifice of the capillary tube.

14. The method of claim 13, wherein the method is performed using an apparatus further comprising at least:
a microscope;
a second micromanipulator operably coupled to the capillary tube holder or the microscope stage;
a vacuum conduit having a first conduit end adapted to connect to the second end of the capillary tube and a second conduit end adapted to connect to a vacuum pump;
a vacuum pump;
a laser light source;
a camera; or
a computer monitor.

15. The method of claim 10, further comprising repeating the method on the biological sample so as to collect a plurality of materials from the biological sample.

16. The method of claim 10, further comprising repeating the method on a plurality of biological samples so as to collect a plurality of materials from the plurality of biological samples.

17. The method of claim 10, wherein the method is practiced on a biological sample comprising a tissue section that is between 10 μm and 100 μm in thickness.

18. The method of claim 10, wherein the method is practiced on a biological sample comprising a fluorescently labelled material.

19. The method of claim 15, further comprising using an automated apparatus to collect the materials.

20. The method of claim 10, wherein the material so collected is subjected to a further collection or examination step comprising at least one of the following steps:
washing the material;
centrifuging the material
contacting the material with a nucleic acid probe that hybridizes with a selected nucleic acid sequence;
contacting the material with an antibody that binds a selected polypeptide sequence; or placing the material into an in vitro tissue culture under conditions suitable for mammalian cell growth.

21. A system for the microscopic collection of a biological sample comprising:
a microscope stage;
a capillary tube having a first end comprising a collection orifice adapted to collect a material in the biological sample and a second end adapted to connect to a vacuum source;
a vacuum pump operably coupled to the second end of the capillary tube and having a pneumatic controller that controls the amount of suction applied to the second end of the capillary tube;
a capillary tube holder operably coupled to the capillary tube;
a micromanipulator operably coupled to:
the capillary tube holder; or
the microscope stage; and
a fiber optic cable that directs a beam of red or green light from a light source along the longitudinal axis of the capillary tube so that the beam of red or green light is localized to the collection orifice at the first end of the capillary tube thereby forming an area of illumination on the collection orifice, wherein the area of illumination consists essentially of the red or green light emitted by the light source and indicates a site of capillary tube contact with the material in the biological sample.

* * * * *